United States Patent [19]

Brock et al.

[11] Patent Number: 5,786,400

[45] Date of Patent: Jul. 28, 1998

[54] PROCESS FOR THE PRODUCTION OF A RIGID POLYURETHANE FOAM AND A COMPOSITION FOR THE PRODUCTION OF A RIGID POLYURETHANE FOAM

[75] Inventors: Martin Brock, Hyogo-ken; Mitsuaki Ikebe, Osaka-ken; Teruo Hama, Hyogo-ken, all of Japan

[73] Assignee: Sumitomo Bayer Urethane Co., Ltd., Hyogo-ken, Japan

[21] Appl. No.: 907,811

[22] Filed: Aug. 8, 1997

[30] Foreign Application Priority Data

Aug. 13, 1996 [JP] Japan ................................. 8-213512

[51] Int. Cl.$^6$ ................................................. C08J 9/14
[52] U.S. Cl. ................................................. 521/117; 521/131
[58] Field of Search ................................. 521/117, 131

[56] References Cited

U.S. PATENT DOCUMENTS

| | | | |
|---|---|---|---|
| 5,451,615 | 9/1995 | Birch | 521/132 |
| 5,624,969 | 4/1997 | Seifert et al. | 521/117 |
| 5,684,092 | 11/1997 | Seifert et al. | 521/117 |

*Primary Examiner*—Morton Foelak
*Attorney, Agent, or Firm*—Joseph C. Gil; Lyndanne M. Whalen

[57] ABSTRACT

The present invention relates to a method of producing a rigid polyurethane foam in which a polyisocyanate containing a benzene ring is used as an organic isocyanate and a polyether polyol and/or polyester polyol is used as a polyol, characterized in that a hydrocarbon is used as the blowing agent and a compound having a hydrophobic group and a hydroxyl group in the molecule is used as an emulsifying agent. The blowing agent is preferably a hydrocarbon selected from the group consisting of cyclopentane, n-pentane and iso-pentane.

3 Claims, No Drawings

PROCESS FOR THE PRODUCTION OF A RIGID POLYURETHANE FOAM AND A COMPOSITION FOR THE PRODUCTION OF A RIGID POLYURETHANE FOAM

The present invention relates to a process for producing a rigid polyurethane foam, a composition for the production of a rigid polyurethane foam and the use of this rigid polyurethane foam as thermal insulation material.

Chlorofluorocarbons (hereinafter referred to as CFC) have hitherto been used as blowing agents for rigid polyurethane foams. Particular, trichlorofluoromethane (R11) has been used.

However, since CFC's contain chlorine their use as blowing agents has given rise to concerns about the environmental problems involved as the depletion of the ozone layer in the stratosphere and global warming. In order to protect the global environment, the production and use of CFC's is now prohibited and the CFC's have to be replaced by substitutes. At present, hydrofluorochlorocarbons (HCFC's) having a small ozone layer depletion factor are used as blowing agents. For example, HCFC-141b (1,1-dichloro-1-fluoroethane), HCFC-22 (chlorodifluoromethane), HCFC-142b (1-chloro-1,1-difluoroethane) have been industrialized and they are already used as blowing agents for a thermal insulation.

However, the HCFC's also contain a chlorine atom in the molecule and they therefore still have the effect of depleting the ozone layer, even though the degree thereof is small. At an international level, the restrictions of the use of chlorine-containing compounds have been imposed and the extent of that use is being gradually reduced. Accordingly, in view of the necessity for the environmental protection, the use of a blowing agent having no effect on the ozone layer has recently been proposed. For some uses a hydrocarbon blowing agent containing no chlorine atoms and causing no depletion of the ozone layer (e.g., cyclopentane) has already been used.

Rigid polyurethane foams, in which a cyclopentane has been used as the blowing agent, have good thermal insulation properties and are, therefore, widely used as thermal insulation for refrigerators, as constructional material for buildings or vehicles.

However, although cyclopentane is a recommendable blowing agent since it is harmless to the global environment, its compatibility with active hydrogen compounds such as polyols is extremely poor, thus resulting in the poor long term storage stability of polyol mixtures containing cyclopentane.

When mixing a polyol and a hydrocarbon blowing agent, the phase stability of the polyol mixture can be improved by adding a compound such as a surface active agent as an emulsifying agent, but where conventional surface active agents such as polyoxyethylenealkylethers, polyoxyethylene phenols, alkylbenzenesulfonate salts, nonyl phenol and stearyl alcohol are used, the compatibility with the hydrocarbon blowing agent is improved but the mechanical properties of the finished polyurethane foam are impaired.

Although it is known that conventional emulsifying agents can solve the problem of the solubility, cyclopentane in polyols, such agents cause the finished rigid polyurethane foam to become soft, and the costs are also increased. Accordingly, when cyclopentane is used as a blowing agent, improvement of the long term storage stability of the polyol mixture is required, while maintaining the high thermal conductivity and mechanical strength of the thermal insulation material.

The present invention provides a process for producing a rigid polyurethane foam comprising reacting a polyisocyanate containing a benzene ring as an organic isocyanate with a polyether polyol and/or polyester polyol in the presence of one or more catalysts, a blowing agent and optionally auxiliary substances and/or additives, characterized in that a hydrocarbon is used as the blowing agent, and a compound having a hydrophobic group and a hydroxyl group in the molecule is used as the emulsifying agent.

The present invention also provides a composition for the production of rigid polyurethane foams, comprising:

(1) an organic isocyanate which comprises a polyisocyanate containing a benzene ring, (2) a polyol which comprises a polyether polyol and/or polyester polyol, (3) a blowing agent which comprises a hydrocarbon, (4) an emulsifying agent which comprises a compound having a hydrophobic group and a hydroxyl group in the molecule, (5) a catalyst and optionally auxiliary substances and/or additives.

In the process according to the invention, (1) an organic polyisocyanate, (2) a polyol, (3) a blowing agent, (4) an emulsifying agent and (5) a catalyst are used. If necessary auxiliary substances and/or additives such as (6) water, (7) a surfactant, (8) a chain extender and/or a crosslinking agent, (9) and other additives (e.g., flame retardants and fillers) can be used.

As the organic polyisocyanate (1), a polyisocyanate such as tolylene diisocyanate (TDI), diphenylmethane diisocyanate and polymethylenepolyphenyl polyisocyanate (polymeric MDI) and a modified polyisocyanate thereof are used alone or in the form of a mixture.

A modified polyvalent isocyanate, i.e., a product obtained by the partial chemical reaction of an organic di- and/or polyisocyanate can be used. For example, a di- and/or polyisocyanate containing esters, ureas, biurets, allophanates, carbodiimides, isocyanurates and/or urethane groups is used. For example, an urethane-group-containing organic, preferably, aromatic polyisocyanate having an NCO content of 33.6 to 15 wt %, preferably 31 to 21 wt % can be used, such as for example, 4,4'-diphenylmethane-diisocyanate or 2,4- or 2,6-tolylene diisocyanate, which is modified with a low-molecular-weight diol, triol, dialkylene glycol, trialkylene glycol or a polyoxyalkylene glycol having a molecular weight of not more than 1,500. As a di- or polyoxyalkylene glycol, an individual compound or a mixture thereof can be used. For example, a diethylene-, dipropylene glycol, polyoxyethylene-, polyoxypropylene-, polyoxy-ethylene glycol or -triol can be used.

Further, an NCO group-containing prepolymer having an NCO content of 25 to 9 wt %, preferably 21 to 14 wt %, based on the total weight can be used. This is prepared from a mixture of the a polyester- and/or preferably polyether-polyol, with 4,4'-diphenylmethane-diisocyanate, 2,4'- and 4,4'-diphenylmethane diisocyanate, 2,4- and/or 2,6-tolylene-diisocyanate or crude MDI. Furthermore, liquefied carbodiimide groups and/or isocyanurate group-containing polyisocyanates are preferred. These polyisocyanates have an NCO content of 33.6 to 15 wt %, preferably 31 to 21 wt %. For example, it is prepared on the basis of 4,4'-, 2,4'- and/or 2,2'-diphenylmethane-diisocyanate and/or 2,4- and/or 2,6-tolylenediisocyanate.

The polyol (2) is a polyether polyol or a polyester polyol.

The polyether polyol is prepared by adding propylene oxide (PO) and/or ethylene oxide (EO) to a starting raw material such as ethylene glycol, propylene glycol, glycerine, trimethylolpropane, pentaerythritol, triethanolamine, ethylenediamine, toluenediamine (TDA) and sugar.

The polyether polyol can be prepared by a conventional method, for example, by adding at least one alkylene oxide containing an alkylene chain having 2 to 4 carbon atoms to a starting material containing 2 to 8, preferably 3 to 8 reactive hydrogen atoms, by anion polymerization in the presence of a catalyst, for example, an alkali hydroxide such as sodium hydroxide and potassium hydroxide or an alkaline alcoholate such as sodium methylate, sodium- or potassium ethylate or potassium isopropylate, or by cationic polymerization in the presence of a catalyst, such as for example, a Lewis acid such as pentachloroantimony and boron fluoride-etherate, or clay.

Examples of the preferred alkylene oxide are tetrahydrofuran, 1,3-propylene oxide, 1,2- or 2,3-butylene oxide, styrol oxide, and in particular, ethylene oxide, 1,2-propylene oxide, etc. These alkylene oxides can be used alone or in the term of mixtures. Water, an organic dicarboxylic acid such as succinic acid, adipic acid, phthalic acid and terephthalic acid, an aliphatic or aromatic substituted diamine which may be substituted with N-mono-, N,N- or N,N'-dialkyl group and has 1 to 4 carbon atoms in the alkyl chain, for example, ethylenediamine, diethylenetriamine, triethylenetetramine, 1,3-propylenediamine, 1,3- or 1,4-butylenediamine, 1,2-, 1,3-, 1,4-, 1,5- and 1,6-hexamethylenediamine, phenylenediamine, 2,3-, 2,4- and 2,6-tolylenediamine, and 4,4'-, 2,4'- and 2,2'-diaminodiphenylmethane which may be substituted with a mono- or dialkyl group can be used as the starting molecule.

Examples of further possible reactive starting molecules are alkanolamines such as ethanolamine, diethanolamine, N-methyl- and N-ethyl-ethanolamine, N-methyl and N-ethyl-diethanolamine, triethanolamine, and ammonia.

Preferably, a polyvalent, particularly, a trivalent and/or more valent alcohol such as ethanediol, propanediol-1,2 and propanediol-1,3, diethylene glycol, dipropylene glycol, butanediol-1,4, hexanediol-1,6, glycerine, trimethylolpropane, pentaerythritol, sorbitol and sucrose (sugar) are used.

The polyether polyol has functionality of preferably 3 to 8, particularly preferably 3 to 6. Its hydroxyl value is preferably from 300 to 850, particularly preferably from 350 to 800.

The polyester polyol, used can be produced from a polyvalent carboxylic acid and a polyvalent alcohol, such as for example, polyethylene terephthalate.

The preferred polyester polyol can be prepared from, for example, an organic dicarboxylic acid having 2 to 12 carbon atoms, preferably an aliphatic dicarboxylic acid having 4 to 6 carbon atoms, and a polyvalent alcohol, particularly a diol having 2 to 12 carbon atoms, preferably 2 to 6 carbon atoms.

Examples of the dicarboxylic acid are succinic acid, glutaric acid, adipic acid, suberic acid, azelaic acid, sebacic acid, decanedicarboxylic acid, maleic acid, fumaric acid, phthalic acid, isophthalic acid and terephthalic acid. Instead of a free dicarboxylic acid, a corresponding dicarboxylic acid derivative such as a dicarboxylic acid monoester or diester prepared by esterification with an alcohol having 1 to 4 carbon atoms or dicarboxylic anhydride can be used.

Examples of the dihydric and polyvalent alcohol, particularly the diol, are ethanediol, diethylene glycol, 1,2- or 1,3-propanediol, dipropylene glycol, 1,4-butanediol, 1,5-pentanediol, 1,6-hexanediol, 1,10-decanediol, glycerine and trimethylolpropane. Preferably, ethanediol, diethylene glycol, 1,4-butanediol, 1,5-pentanediol, 1,6-hexanediol, or a mixture prepared from at least two of the above-mentioned diols, particularly a mixture prepared from 1,4-butanediol, 1,5-pentanediol and 1,6-hexanediol are used. Furthermore, a polyester polyol produced from a lactone such as ε-caprolactone or a hydroxycarboxylic acid such as a ω-hydroxycaproic acid can be used.

The amount of the polyol (2) used is preferably 40 to 100 parts by weight, particularly 60 to 90 parts by weight, based on 100 parts by weight of the organic isocyanate.

The blowing agent (3) may be a hydrocarbon having 2 to 8, particularly 4 to 6 carbon atoms (e.g., an alkane or a cycloalkane). The blowing agent (3) can be selected from the group consisting of an alkane, a cycloalkane, a dialkylether, a cycloalkyleneether and a fluoroalkane (e.g., a compound having a fluorine atom and a hydrogen atom).

Examples of the alkane are propane, n-butane, isobutane, n-pentane, isopentane and n-hexane. Examples of the cycloalkane are cyclobutane, cyclopentane, cyclohexane, cycloheptane and cyclooctane. Examples of the dialkylether are dimethylether, methylethylether or diethylether. An example of the cycloalkyleneether is furan. Examples of the fluoroalkane are trifluoromethane, difluoromethane, difluoroethane, tetrafluoroethane, heptafluoropropane, etc.

The blowing agent is preferably a hydrocarbon selected from a group consisting of cyclopentane, n-pentane and iso-pentane. Cyclopentane is particularly preferred.

The amount of blowing agent (3) used is preferably from 3 to 50 parts by weight, particularly from 5 to 40 parts by weight, based on 100 parts by weight of the organic isocyanate.

The compound used as the emulsifying agent (4) reacts with the isocyanate for the production of a rigid polyurethane foam. As a result, water is formed. The water formed reacts with the organic isocyanate to form carbon dioxide. The carbon dioxide gas promotes the blowing efficiency as a result of which foam density can be decreased.

In the emulsifying agent (4), the hydrophobic group may be a hydrocarbon group, particularly an alkyl group. The number of the carbon atoms in the hydrocarbon group may be from 5 to 40, particularly from 5 to 20. The hydrocarbon group is preferably branched. The emulsifying agent (4) is preferably a branched hydrocarbon compound containing one hydroxyl group.

Examples of the emulsifying agent (4) used are n-butanol, nonyl phenol, t-butanol, lauryl alcohol and polyoxyethylenephenols. T-butanol is particularly preferred.

The amount of emulsifying agent used is preferably from 0.1 to 15 parts by weight, particularly from 0.2 to 5 parts by weight, based on 100 parts by weight of the organic isocyanate.

As the catalyst (5), conventional and known amine catalysts and metallic catalysts can be used. Examples of the amine catalyst are a tertiary amine such as triethylenediamine, tetramethylhexamethylenediamine, pentamethyldiethylenetriamine, dimethylcyclohexyltriamine and methyl morpholine.

Examples of the metallic catalyst are organometallic compounds such as stannous octoate, dibutyltin dilaurate and lead octylate.

The amount of catalyst (5) used is preferably from 0.001 to 5 parts by weight, particularly from 0.05 to 2 parts by weight, based on 100 parts by weight of the organic isocyanate.

Auxiliary substances and/or additives are optionally used. The optionally used water (6) functions as a blowing agent. The amount of water (6) used is preferably from 0 to 5 parts by weight, particularly from 0.5 to 3 parts by weight, based on 100 parts by weight of the organic isocyanate.

Organic silicone compounds can be used as the optionally used surfactant (7). The amount of surfactant (7) used is preferably from 0 to 5 parts by weight, particularly from 1 to 3 parts by weight, based on 100 parts by weight of the organic isocyanate.

Examples of the optionally used chain extender and/or crosslinking agent (8) are an alkanolamine, and a diol and/or triol particularly having a molecular weight of not more than 400, preferably 60 to 300.

Examples of the alkanolamine are ethanolamine and/or isopropanolamine. Examples of the dialkanolamine are diethanolamine, N-methyldiethanolamine, N-ethyldiethanolamine and diisopropanolamine. Examples of the trialkanolamine are triethanolamine and triisopropanolamine.

An adduct prepared from ethylene oxide or 1,2-propylene oxide and an alkylenediamine having 2 to 6 carbon atoms in an alkylene chain, such as for example, N,N'-tetra(2-hydroxyethyl)ethylene-diamine and N,N'-tetra(2-hydroxypropyl)ethylene-diamine, may be used.

Furthermore, an aliphatic, cycloaliphatic and/or aromatic diol having 2 to 14, preferably 4 to 10 carbon atoms, for example, ethylene glycol, propanediol-1,3, decanediol-1,10, o-, m-, p-dihydroxycyclohexane, diethylene glycol, dipropylene glycol and preferably butanediol-1,4, hexanediol-1,6 and bis-(2-hydroxyethyl)hydroquinone, can be used.

Furthermore, 1,2,4-, 1,3,5-trihydroxycyclohexane and glycerine can, for example, be used as the tiol.

The amount of the chain extender and/or the crosslinking agent (8) used is preferably from 0 to 20 wt %, particularly from 2 to 5 wt % based on the polyol.

Examples for the optionally used additives (9) are blowing stabilizers, foam controlling agents, fillers, dyes, pigments, flame retardants, hydrolysis inhibitors, mildew-proofing agents, bactericides and the like. The amount of additive (9) used is preferably from 1 to 40 parts by weight, particularly from 5 to 20 parts by weight, based on 100 parts by weight of the organic polyisocyanate.

Examples of the filler are carbon black and calcium carbonate.

Examples of the suitable flame retardant are tricresyl phosphate, tris-(2-chloroethyl)phosphate, tris-(2-chloropropyl)phosphate, tris-(1,3-dichloropropyl) phosphate, tris-(2,3-dibromopropyl) phosphate, tetrakis-(2-chloroethyl)-ethylenediphosphate etc. In addition to the above-mentioned halogen-substituted phosphate, the following can be mentioned: an inorganic flame retardant such as red phosphorus, aluminum oxide hydrate, antimony trioxide, arsenic oxide, ammonium polyphosphate and calcium sulfate; a cyanuric acid derivative such as melamine or a mixture of at least two kinds of flame retardants, such as for example, an ammonium polyphosphate and melamine.

The equivalent ratio of the isocyanate group in the polyisocyanate to the reactive hydrogen atom of the polyol, the emulsifying agent and the chain extender and/or the crosslinking agent is 0.85 to 1.25:1, preferably 0.95 to 1.15:1, particularly favorably 1.0 to 1.10:1.

The rigid polyurethane foam can be prepared by a non-continuous process or continuous process, by a prepolymer process, or a one shot foaming process using known mixing equipment.

The a particularly preferred process, binary process (using the components (A) and (B)). Component (A) is composed of the organic polyisocyanate and component (B) is composed of the remaining constituents other than the organic polyisocyanate (1).

The starting raw material components are mixed at 15° to 90° C., preferably 20° to 35° C., and introduced into an open molding machine in which the temperature can be controlled. The reaction mixture was blown without pressure in order to avoid peripheral compression. In order to produce, for example, a laminated composite material, a foamable reaction mixture is suitably injected or sprayed on the back of the surface layer and blown to from a cured rigid polyurethane foam.

The rigid polyurethane foam preferably has a density of 20 to 100 kg/m$^3$ and a thermal conductivity of 0.0140 to 0.0230 kcal/mh°C.

The rigid polyurethane foams produced according to the invention can be used as thermal insulation material, e.g. as an intermediate layer in a thermally insulating laminated composite material, an injectable foam for filling the hollow space inside a cooling-and-freezing device, in particular, a refrigerator or a freezer, a thermal insulation jacket for containers for the storage of hot water or the thermal insulation of articles to be heated.

Hereinafter, the present invention is explained in more detail by means of examples and comparative examples.

EXAMPLES

Examples 1 to 3 and Comparative Examples 1 to 3

A mixed polyol liquid was prepared by mixing an amine catalyst (N,N-dimethylcyclohexylamine) (the amount required for adjusting the reactive gel time to approximately 50 seconds), 2 parts by weight of a surfactant (L-5421, manufactured by Nippon Unicar Co., Ltd.) and 0.5 parts by weight of water with 50 parts by weight of polyol A, 30 parts by weight of polyol B and 20 parts by weight of polyol C. The mixed polyol liquid t-Butanol or polyoxyethylene nonyl phenol w as added as emulsifying agent and cyclopentane as the blowing agent in order to prepare a polyol mixture.

Polyol A: A polyol having a hydroxyl value of 450 mg KOH/g and obtained by the addition of propylene oxide (PO) using sugar as a starting raw material.

Polyol B: A polyol having a hydroxyl value of 400 mg KOH/g and obtained by the addition of PO using toluenediamine (TDA) as a starting raw material.

Polyol C: A polyol having a hydroxyl value of 380 mg KOH/g and obtained by the addition of PO using ethylenediamine as a starting raw material.

Based on the formulation of Table 1, the above-mentioned polyol mixture (comprising the mixed polyol liquid, cyclopentane, t-butanol or polyoxyethylene nonyl phenol) and polymeric MDI were mixed by a mixer. The temperature of the urethane raw material was adjusted to 20° C. A rigid polyurethane foam obtained by stirring and mixing the urethane mixture liquid was introduced into a mold made of aluminum and having a size of 600 mm×400 mm×50 mm. Seven minutes later, the molded article was removed from the mold. The foam properties of the demolded article are shown in Table 2.

Cream time:

The time required for foaming the reactive mixture turned into cream-like opaque, from the beginning of stirring and mixing the polyol mixture and an isocyanate liquid, was measured.

Gel time:

The time required for threading foams from a stick stuck in the foams, from the beginning of mixing the reaction raw materials, was measured.

Free foam density:

Foam density was measured when carrying out free foaming in a box made of veneered material, of which the internal dimension is 150 mm×300 mm×150 mm.

Compression strength:

A 50 mm cubic sample cut from the core portion of a foam was compressed toward a direction vertical to a stream. A stress (10 mm/min. head speed) was measured when its displacement reached 10%.

Dimensional stability at low temperature:

The rate of dimensional deformation was measured when a 50 mm cubic sample cut from the core portion of a foam was retained at −30° C. for 48 hours.

Thermal conductivity:

The thermal conductivity of a sample having a size of 200 mm×300 mm×25 mm, which was cut from the core portion of a foam, was measured by a device for measuring thermal conductivity manufactured by Eikoseisha Co., Ltd. (Autoramuda). The average temperature was 23.7° C.

In Comparative Examples 1 and 2, when using the conventional and known emulsifying agent polyoxyethylene nonyl phenol, the solubility is improved, but the foam properties are deteriorated. However, when using t-butanol according to the invention in Examples 1, 2 and 3, the solubility is improved and good foam properties are maintained.

In the present invention, the solubility of a blowing agent such as cyclopentane is improved. Accordingly, the long term storage stability of a polyol mixture containing a blowing agent is improved. Also, it is possible to maintain good thermal conductivity and high mechanical strength of a thermal insulation material.

We claim:

1. A process for the production of a rigid polyurethane foam in which a polyisocyanate containing a benzene ring is used as an organic isocyanate and a polyether polyol and/or polyester polyol is used as a polyol, characterized in that a hydrocarbon is used as blowing agent and an emulsifying agent which consists of t-butanol.

TABLE 1

| Amount (parts by weight) | Comp. Example 1 | Comp. Example 2 | Comp. Example 3 | Example 1 | Example 2 | Example 3 |
| --- | --- | --- | --- | --- | --- | --- |
| Mixed polyol liquid | 100 | 100 | 100 | 100 | 100 | 100 |
| Isocyanate | 126 | 126 | 127 | 127 | 128 | 129 |
| Cyclopentane | 17 | 17 | 17 | 17 | 17 | 17 |
| t-butanol | 0 | 0 | 0 | 1 | 2 | 4 |
| Polyoxyethylene-nonylphenol | 0 | 1 | 2 | 0 | 0 | 0 |

TABLE 2

| | Comp. Example 1 | Comp. Example 2 | Comp. Example 3 | Example 1 | Example 2 | Example 3 |
| --- | --- | --- | --- | --- | --- | --- |
| Cream time (sec.9) | 8 | 8 | 8 | 8 | 8 | 8 |
| Gel time (sec.) | 47 | 47 | 49 | 47 | 50 | 50 |
| Free foam density (kg/m$^3$) | 27.4 | 27.2 | 27.0 | 27.0 | 26.4 | 26.2 |
| Foam density (kg/m$^3$) | 35.7 | 36.5 | 36.2 | 36.2 | 36.1 | 34.3 |
| Compression strength (kg/m$^3$) | 1.91 | 2.15 | 2.02 | 2.00 | 2.04 | 1.98 |
| Dimensional stability at low temperature (%) | 0.3 | 0.4 | 0.5 | 0.2 | 0.3 | 0.5 |
| Thermal conductivity × 10$^{-4}$ (kcal/mh °C.) | 170 | 173 | 174 | 170 | 170 | 173 |

By changing the parts of added cyclopentane to a range between 17 and 24 parts by weight, the solubility in a polyol blend (the mixture comprising a mixed polyol liquid and an emulsifying agent) was tested. The results are shown in Table 3.

2. The process according to claim 1, wherein the blowing agent is a hydrocarbon selected from the group consisting of cyclopentane, n-pentane and iso-pentane.

3. A composition for the production of a rigid polyurethane foam, comprising:

TABLE 3

| | Comp. Example 1 | Comp. Example 2 | Comp. Example 3 | Example 1 | Example 2 | Example 3 |
| --- | --- | --- | --- | --- | --- | --- |
| 17 parts by weight | 0 | | | | | |
| 18 parts by weight | Δ | 0 | 0 | | | |
| 19 parts by weight | x | Δ | Δ–x | 0 | | |
| 20 parts by weight | | x | x | Δ | 0 | |
| 21 parts by weight | | | | x | Δ | |
| 22 parts by weight | | | | | x | 0 |
| 23 parts by weight | | | | | | Δ |
| 24 parts by weight | | | | | | x |

0: Uniform and transparent

Δ: Opaque (white turbidity) separation x: Complete separation (1) an organic isocyanate which comprises a polyisocyanate containing a benzene ring, (2) a polyol which comprises a polyether polyol and/or polyester polyol, (3) a blowing agent which comprises a hydrocarbon, (4) an emulsifying agent which consists of t-butanol, (5) a catalyst and optionally auxiliary substances and/or additives.

* * * * *